US 6,591,273 B2

(12) United States Patent
Jenkins et al.

(10) Patent No.: US 6,591,273 B2
(45) Date of Patent: Jul. 8, 2003

(54) METHOD AND SYSTEM FOR SECURE ELECTRONIC DISTRIBUTION, ARCHIVING AND RETRIEVAL

(75) Inventors: Jim Jenkins, Rustburg, VA (US); Curtis Roberts, II, Lynchburg, VA (US); Susan White, Forest, VA (US)

(73) Assignee: GE Financial Holdings, Inc., Richmond, VA (US)

( * ) Notice: Subject to any disclaimer, the term of this patent is extended or adjusted under 35 U.S.C. 154(b) by 278 days.

(21) Appl. No.: 09/796,523

(22) Filed: Mar. 2, 2001

(65) Prior Publication Data

US 2002/0123980 A1 Sep. 5, 2002

(51) Int. Cl.[7] .............................................. G06F 17/30
(52) U.S. Cl. ..................... 707/102; 707/104.1; 707/2; 707/201; 709/206; 709/207; 709/227; 710/100
(58) Field of Search .............................. 707/102, 104.1, 707/2, 201; 709/206, 207, 227; 710/100

(56) References Cited

U.S. PATENT DOCUMENTS

| 4,962,532 | A |  | 10/1990 | Kasiraj et al. |
| 5,724,567 | A | * | 3/1998 | Rose et al. ................... 707/2 |
| 5,923,846 | A | * | 7/1999 | Gage et al. ................... 709/206 |
| 5,928,333 | A |  | 7/1999 | Landfield et al. |
| 6,363,427 | B1 | * | 3/2002 | Teibel et al. ................ 709/227 |
| 6,438,632 | B1 | * | 8/2002 | Kikugawa ................... 710/100 |
| 6,484,196 | B1 | * | 11/2002 | Maurille ...................... 709/206 |
| 2001/0018704 | A1 | * | 8/2001 | Kikugawa ................... 709/206 |
| 2002/0016793 | A1 | * | 2/2002 | Keith, Jr. .................... 707/201 |

FOREIGN PATENT DOCUMENTS

| EP | 0 375 139 A2 |  | 6/1990 |  |
| EP | 1 128 288 A2 | * | 8/2001 | ........... G06F/17/30 |

OTHER PUBLICATIONS

Donelly et al., Building an Intermet Resource for a Specialized Online Community, Oct. 1994, ACM The International Society for Optical Engineering, pp. 190–197.*
Wall, Converting from a Paper to an On–line Computing Center Newsletter, 1993, ACM, pp. 412–418.*
Jarrell et al., Network–Based Systems for Asynchronous Group Communication, 1986, ACM, pp. 184–191.*
PCT–International Search Report dated Jun. 12, 2002 for Application Ser. No. PCT/US02/06590, filed Mar. 4, 2002.

* cited by examiner

Primary Examiner—Frantz Coby
(74) Attorney, Agent, or Firm—Hunton & Williams LLP (57) ABSTRACT

The present invention provides a secure electronic information distribution, archiving and retrieval method and system for communication and correspondence purposes using an integrated system of email, email links and secured online web sites. An information bulletin may be maintained in a secure, easy to use searchable archive. A bulletin notification may be used to send information bulletin summaries and links on a regular or predetermined basis, or on an ad hoc basis, to inform and/or alert one or more recipients of receipt of the information bulletin. The information bulletin may be accessed through a direct link, which may be randomly generated to preserve security and authenticity of the information bulletin. The information bulletin may further include links to attachments and other interactive information.

20 Claims, 6 Drawing Sheets

METHOD AND SYSTEM FOR SECURE ELECTRONIC DISTRIBUTION, ARCHIVING AND RETRIEVAL

BACKGROUND OF THE INVENTION

The present invention relates generally to the field of secure electronic information distribution, archiving and retrieval systems, in particular, to a method and system for integrating electronic mail, electronic mail links and secure online web sites for enabling communication and information exchange.

Electronic mail and other forms of electronic exchange of information have become a common form of communication for individuals and entities, including businesses for internal as well as external correspondence. Oftentimes, attachments and large amounts of information may be conveyed electronically with electronic mail for convenience, affordability and speed. Businesses have come to rely on electronic information exchange as a method for communicating valuable, time sensitive or even privileged information on a regular basis.

Traditionally, delivery of electronic mail with attachments may be slow and the attachments may be difficult to access. In addition, security of information may be compromised through traditional electronic information exchange methods. Individuals may be wary about electronically sending important, privileged or confidential documents. Moreover, when a recipient receives and opens an attachment, such as a document, for example, it is very easy for a recipient to make alterations, either intentionally or inadvertently, thereby compromising the authenticity of the document.

Any one business may have many different entities with which to communicate on a regular basis through documented correspondence. Traditional paper updates may become overly burdensome and difficult to manage. Redistribution may also be difficult and inefficient for a business with various levels of management and many separate departments or divisions. There may be instances where an attachment or document may require modification or conversion prior to any redistribution due to inclusion of privileged or secret information in the attachment or the document. Additionally, the more business relationships with different entities any one business has, the more burdensome the correspondence process becomes.

While a notice may be given to a recipient indicating that a relevant communication has been received, such notice may merely inform the recipient that relevant information may exist. The recipient may still be required to search and/or navigate through a sender's web site or other user interface to gain access to the relevant communication. The recipient of the notice may also be required to provide a password and/or to engage in another authorization or registration process in order to gain access to the relevant communication. In addition, banners, advertisements and/or other information at the sender's web site may be distracting and provide little viewing space to the recipient for viewing the relevant communication.

These and other drawbacks exist with current methods and systems.

BRIEF SUMMARY OF THE INVENTION

Advantages of the invention will be set forth in part in the description which follows, and in part will be understood from the description, or may be learned by practice of the invention. The advantages of the invention may be realized and attained by means of the instrumentalities and combinations particularly pointed out in the appended claims.

This invention, in one aspect, includes a method for secure electronic information distribution, archiving and retrieval comprising the steps of identifying one or more information bulletins for distribution to one or more intended recipients; converting each information bulletin to a bulletin format wherein the bulletin format restricts modifications to the information bulletin; placing each information bulletin in the bulletin format in an archive at a site wherein the information bulletin is accessible by a bulletin link wherein each bulletin link is a randomly generated address; sending a bulletin notification notifying the one or more intended recipients of availability of the one or more information bulletins wherein the bulletin notification comprises an associated bulletin link for each information bulletin; and enabling the one or more intended recipients to access the one or more information bulletins through the associated bulletin links.

In another aspect, the invention includes a system for secure electronic information distribution, archiving and retrieval. The system comprises identification means for identifying one or more information bulletins for distribution to one or more intended recipients; conversion means for converting each information bulletin to a bulletin format wherein the bulletin format restricts modifications to the information bulletin; placement means for placing each information bulletin in the bulletin format in an archive at a site wherein the information bulletin is accessible by a bulletin link wherein each bulletin link is a randomly generated address; sending means for sending a bulletin notification notifying the one or more intended recipients of availability of the one or more information bulletins wherein the bulletin notification comprises an associated bulletin link for each information bulletin; and access means for enabling the one or more intended recipients to access the one or more information bulletins through the associated bulletin links.

The accompanying drawings, which are incorporated in and constitute a part of this specification, illustrate various embodiments of the invention and, together with the description, serve to explain the principles of the invention.

DETAILED DESCRIPTION OF THE INVENTION

The present invention provides a secure electronic information distribution, archiving and retrieval method and system for communication and correspondence purposes using an integrated system of email, email links and secured online web sites.

The present invention enables an entity to electronically communicate with a second entity on a regular basis. The present invention may convey information through electronic information bulletins. Further, information bulletins may be archived for retrieval and searchability. A bulletin notification may be used to send information bulletin summaries and links on a regular or a predetermined basis, or on an ad hoc basis, to inform and/or alert a recipient of an available information bulletin. Bulletin notifications may be sent via electronic mail or another form of communication.

According to another embodiment of the present invention, one or more electronic information bulletins may be made available to one or more intended recipients. For example, a bulletin notification may inform an intended recipient of the availability of an information bulletin which may be accessed by a direct link to an Internet web site. As a result, the intended recipient does not have to access and logon to a web site and proactively search and retrieve the intended information bulletin. Further, the intended recipient may select which one or more of a plurality of bulletin links to access thereby minimizing waste and inefficient use of email server space.

According to another embodiment of the present invention, various documents associated with an information bulletin may be attached to the information bulletin thereby making various forms of information readily available to the intended recipient. Direct links may be provided to the attached documents in a central archive rather than sending the actual attached document with the information bulletin thereby facilitating (e.g., speeding up) the receipt of the information bulletin by the intended recipient.

In addition, an information bulletin may be accessed through a direct link, which may be randomly generated. At the direct link, a recipient may be restricted from accessing further information, as an algorithm to related addresses may not be available due to the randomness of the address (e.g., URL) for the direct link. In addition, the information bulletins may be accessed and viewed through an independent secure web site. As a result, security and authenticity of the information bulletins may be maintained.

According to another embodiment of the present invention, the information bulletins and the other related information and attached documents may be in a format that may be easily forwarded to other selected intended recipients. For example, if the information bulletin is sent in a PDF format, the information bulletin may remain in its originally complied format. Another feature may include enabling content to be copied out of the information bulletin. Additional security features for selected bulletins or related information may be implemented, such as password requirements for confidential, privileged or other information.

According to another embodiment of the present invention, a secure, easy-to-use searchable archive may be used to maintain the information bulletins and other related information.

Figure 1:
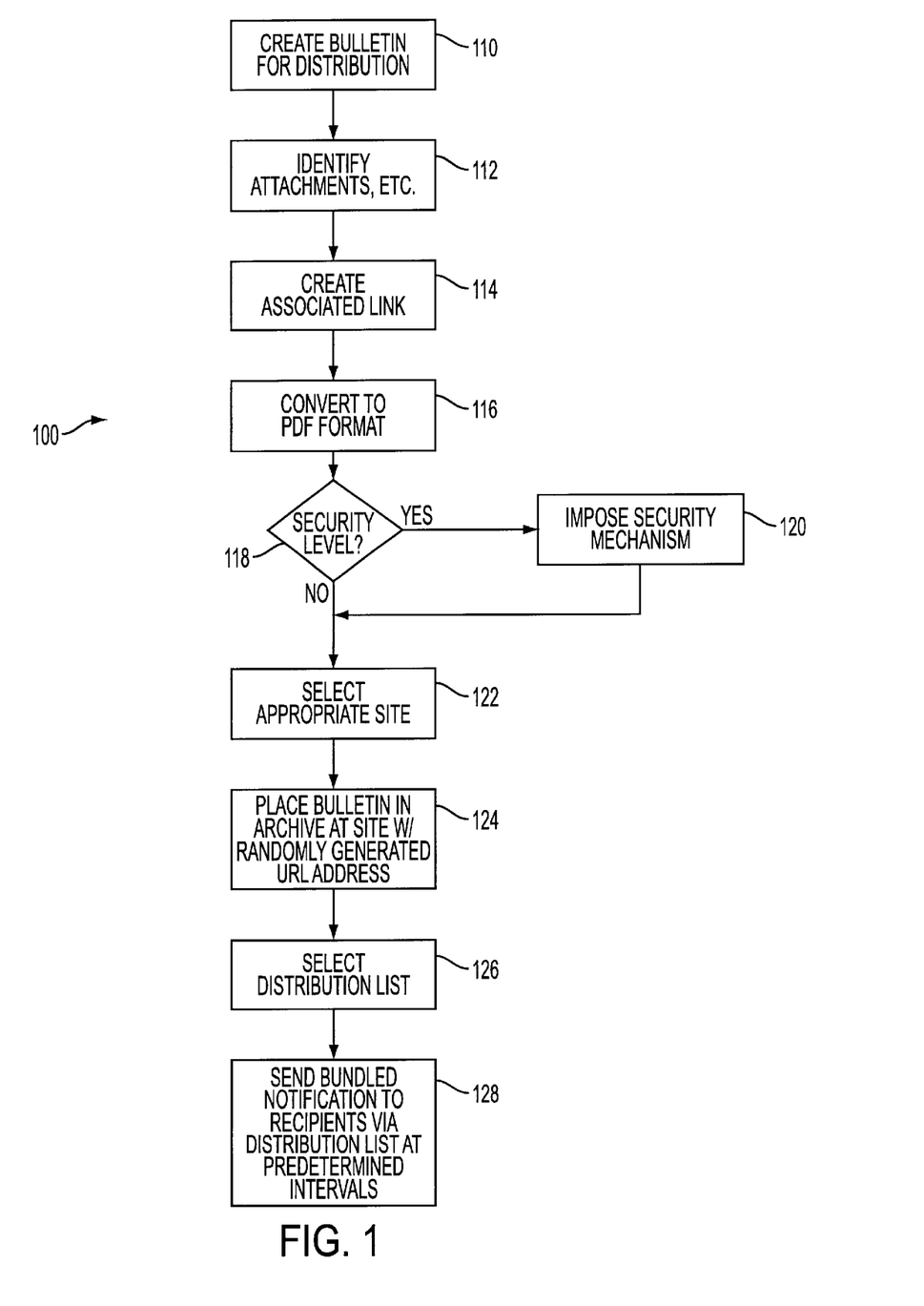
FIG. 1 is a flowchart of the steps in a method for secure electronic information distribution, archiving and retrieval, according to an embodiment of the present invention.

FIG. 1 is a flowchart illustrating the steps performed in a method 100 for implementing a secure electronic information distribution, archiving and retrieval system for communicating with internal or external entities. At step 110, an information bulletin may be identified and/or created. At step 112, one or more relevant attachments may be identified for association with the identified information bulletin. At step 114, a link may be created for association with each of the identified attachments. At step 116, the information bulletin and associated attachments may be converted into a format where edits or other modifications may be minimized or prohibited, such as a PDF format. At step 118, a determination may be made as to whether the information bulletin to be transmitted to an intended recipient is of a particular security level. If so, a security mechanism may be implemented, at step 120. An appropriate Internet Web site may be selected for an archive which Internet Web site has a randomly-generated Internet address, at step 122. At step 124, the information bulletin may be placed in the archive. At step 126, a distribution list of one or more intended recipients for the information bulletin may be selected. At step 128, a notification may be sent to the intended recipients on the distribution list at one or more predetermined intervals. The steps of FIG. 1 will be discussed in more detail below.

At step 110, an information bulletin may be created for electronic distribution to one or more intended recipients. The information bulletin may include various forms of information such as a plurality of documents, graphs, illustrations, charts, scanned images and other similar information. The information bulletin may further include confidential and/or privileged information. The subject matter covered in the information bulletins may include one or more guidelines, announcements, marketing materials, servicing forms, and other topics of interest to the one or more intended recipients.

At step 112, one or more attachments to the information bulletin may be identified. The one or more attachments may include marketing material or other information that may be associated with the information bulletin. Other examples of attachments may include interactive features, such as imprinting options and/or ordering options.

At step 114, a link may be created for association with each of the identified attachments. This feature of the present invention enables a direct link to material associated with the information bulletin to be sent to a recipient rather than the actual attachment. This feature of the invention may facilitate the speed of receipt of the electronic information bulletin since fewer bytes of data need to be electronically transmitted. Furthermore, security and authenticity of the information in the attachment may be preserved and/or enhanced.

At step 116, the information bulletin and other associated attachments may be converted into a format which prevents modifications and/or alterations to the document. For example, the identified information bulletin may be converted into a PDF formatted document. Other formats that minimize and/or prevent modifications to a document may be used. Also, formats that require authorization before viewing a document may be used as well. Other variations may be implemented. This feature ensures that the integrity of the information bulletin will not be compromised, intentionally or inadvertently. The PDF format also enables the information bulletin to be more easily redistributed (e.g., forwarded) to the intended recipients. Additionally, as a PDF document, the information bulletin may remain in its complied format where content may be copied out of the document. Other formats in addition to the PDF format may also be used as would be known to a person of ordinary skill in this field.

At step 118, a determination is made as to whether the information bulletin may be subject to a particular level of security. For example, certain documents may exist that contain confidential or privileged information intended only for a select group of recipients. While the bundled notification may include all information made available in an information bulletin for a predetermined period of time, there may be some material associated with that information bulletin that may be privileged or confidential. Such material may be indicated as being privileged or subject to a security mechanism.

If the determination in step 118 is that certain material associated with the information bulletin is intended to be subject to a higher level of security, a security mechanism may be imposed, at step 120. For example, the security mechanism may include a password requirement. Other types of security mechanisms may also be implemented.

At step 122, an appropriate Internet web site may be selected for use as an archive for the information bulletins. Each unit or department within a multiple unit or department business entity may maintain a separate web site thereby providing relevant information bulletins for retrieval by individuals associated with the unit or department.

At step 124, an information bulletin may be placed in the archive at the selected site. In addition, a random URL address may be generated and associated with the information bulletin. Thus, a recipient may not access the archive for further information bulletins by manipulating the URL due to the random characteristic of the URL address. Additional security features may also be implemented.

At step 126, a distribution list of one or more of the intended recipients for the information bulletin may be selected. For example, the intended recipients may include persons from upper management of the business entity who may then determine what information from the information bulletin to forward to other recipients. For sensitive (e.g., confidential and/or privileged) information a password may be used as a security mechanism, as discussed in steps 118 and 120.

At step 128, a bundled notification may be sent to the intended recipients on the distribution list at a plurality of predetermined intervals. The predetermined intervals may be periodic (e.g., weekly, bi-monthly, monthly, etc.), ad hoc and/or based on a triggering event. For example, the business entity may transmit information bulletins providing update information to a customer on a weekly or other basis. The bundled notification may include notification of a plurality of information bulletins made available during a predetermined period of time prior to the bundled notification.

The bundled notification may include one or more brief summaries, and links to information bulletins placed in the archive during the predetermined period of time. The links may connect the recipient of the bundled notification directly to the information bulletin in the archive with minimal or no other site navigation required. For example, a password (or other security mechanism or other form of authorization) may be required for secured material (e.g., confidential, privileged information).

The accessed information bulletin may further contain one or more attachments, such as marketing material, through links or other mechanisms in the information bulletin. These attachments may also be in a secured location where access to an associated archive may be restricted or otherwise prevented or hindered. The attachments (e.g., marketing material, etc.) may also include various interactive operations and other options, such as ordering and imprinting.

According to an embodiment of the present invention, the information bulletin archive may be searchable. For example, a plurality of search queries may be submitted, which may include a date query, a topic query, a product query, a company query and other similar search criteria. In another example, by entering a privileged information bulletin, a password portal may be automatically generated before access is granted.

Figure 2:
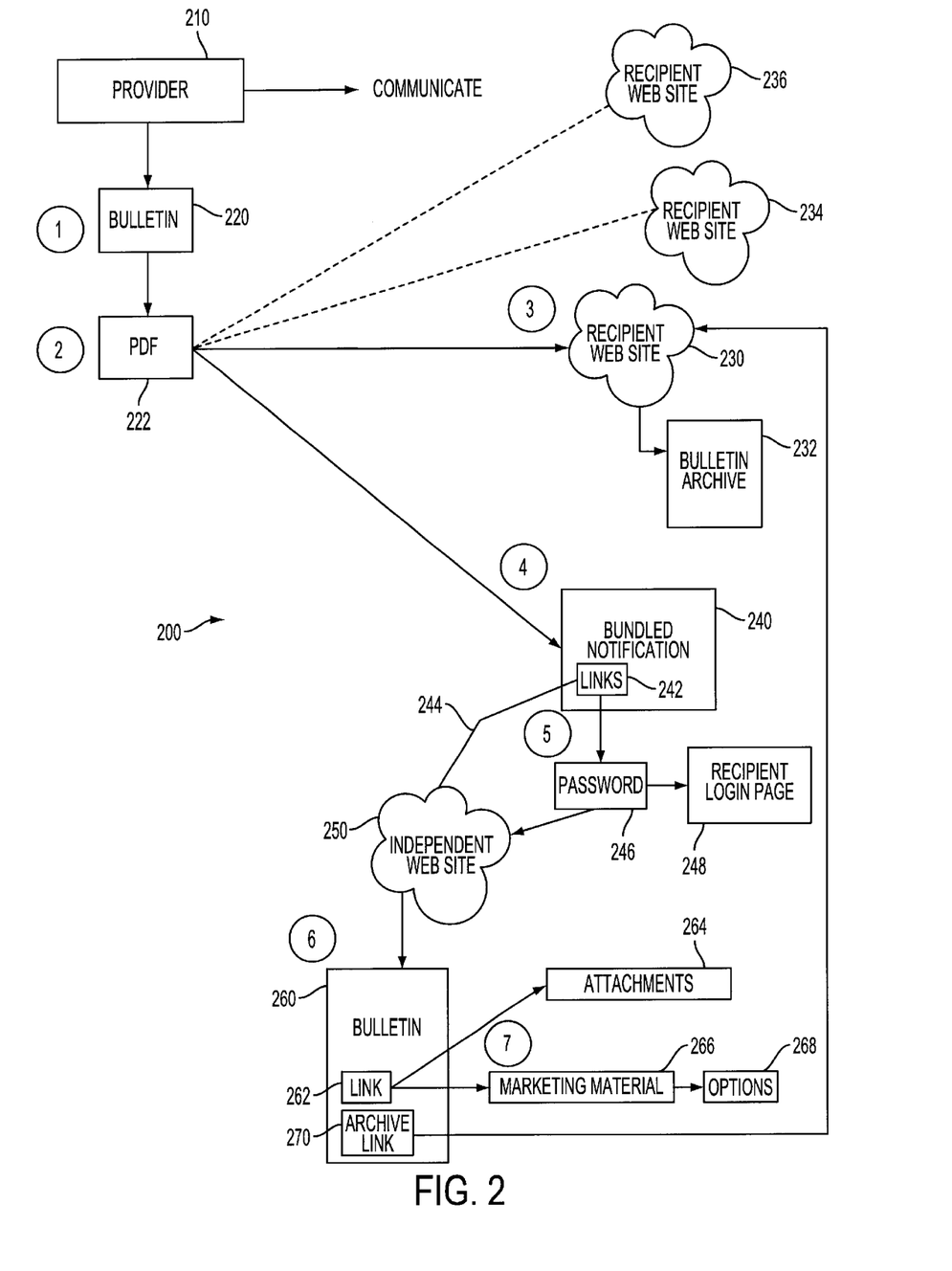
FIG. 2 is an example of a secure electronic information distribution, archiving and retrieval system, according to an embodiment of the present invention.

FIG. 2 is an example of a secure electronic information distribution, archiving and retrieval system 200, according to an embodiment of the present invention. A provider 210 may be a service provider, a product provider and/or another entity (e.g., an insurance carrier). The provider 210 may desire to communicate information bulletins to one or more external customers, and/or internal departments or other entities on a regular basis, electronically and efficiently without generating paper copies of the information bulletins, which may be difficult to redistribute efficiently and quickly to multiple recipients over geographic distances. The present invention may present a direct web site link to each one of the information bulletins where a recipient may gain direct access to the information bulletins with little or no site navigation, and without having to enter identification information, register, and proactively search and retrieve desired information from the web site.

The provider 210 may create an information bulletin 220 of information intended for distribution to one or more selected recipients. The information bulletin 220 may then be converted into a PDF format document 222 or another version of information bulletin 220. The PDF format document 222 may then be sent to a web site having an archive 232 with a randomly selected URL address for security purposes. The archive 232 may be maintained at a web site location, e.g., a recipient web site, such as a web site 230. A business entity may utilize the system 200 to communicate with various separate entities as well as various departments or other segments within the entity. For example, the archive 232 may be maintained on a web site associated with the business entity's brokerage general agents, for example. Other web sites associated with other entities with which the business entity communicates may also maintain archives, as illustrated by an archive 234 and an archive 236.

The archive 232 may include one or more search functions for locating and retrieving a particular information bulletin or a set of information bulletins. In addition, a set of searchable words associated with an information bulletin may be transmitted or loaded into the archive 232.

A bulletin notification 240 may be distributed at one or more predetermined intervals or as otherwise indicated, to a selected distribution list or other set of intended recipients. The bulletin notification 240 may include a plurality of links 242 to information bulletins that have been made available in the archive 232 during a predetermined interval. The bulletin notification 240 may further include other various types of information, such as summaries, titles, and authorization notices for each information bulletin.

By activating one of the links 242, an associated information bulletin 260 may be accessed at an independent web site 250. For example, the one link 242 may access the associated information bulletin 260 directly, as illustrated by 244. Thus, information may be easily obtained without navigation through a web site. In another example, the one link 242 may require a password (or other authorization) to access the information bulletin 260, as illustrated by 246. The one link 242 may link a recipient to a login page 248 before accessing the information bulletin 260. Other variations may be implemented to accommodate varying levels of security and authorization of a recipient with respect to a particular information bulletin.

The independent web site 250 may maintain and provide access to a plurality of information bulletins, as illustrated by the information bulletin 260, through a plurality of links and other mechanisms. In addition, the information bulletin 260 may further include various links 262 to other relevant material, such as a plurality of attachments 264, marketing material 266 and other forms of data. Also, a plurality of options 268 may be available for interactive operations, such as ordering, imprinting and other similar interactive operations.

An archive link 270 may provide access to the archive 232, through an appropriate recipient web site such as the web site 230. Other links to other information and web sites may be listed in the information bulletin 260. For example, a link to a provider's web site may be made available.

Figure 3:
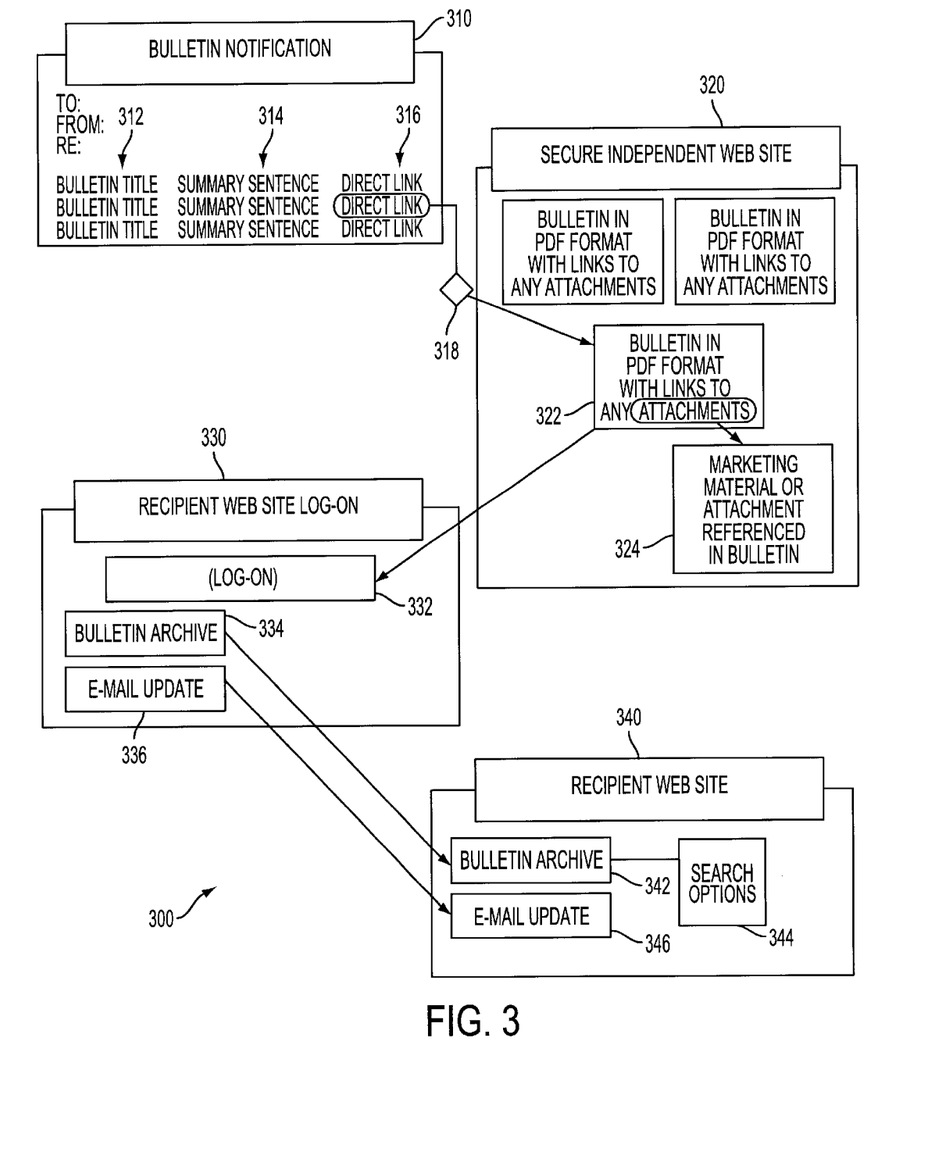
FIG. 3 is an example of interconnections in a secure electronic information distribution, archiving and retrieval system, according to an embodiment of the present invention.

FIG. 3 is an example of a plurality of interconnections in a secure electronic information distribution, archiving and retrieval system 300, according to an embodiment of the present invention. As shown in FIG. 3, a bulletin notification 310 may include a plurality of informational sections including a bulletin title 312, a summary sentence 314, a direct link 316 and other information related to an information bulletin. The bulletin notification 310 may be sent to a plurality of recipients via email or another mode of communication.

By activating the direct link 316 having a randomly-generated URL or other Internet address, one of the recipients may access an associated information bulletin 322. A link 318 may be a direct link or may require a password or other authorization for access to the associated information bulletin 322. The information bulletin 322 may be presented in PDF (or other) format with one or more links to one or more attachments and/or other information. An associated attachment may be accessed through a link 324 connected directly to material in a secure section of a web site 320. In another example, the attachment may be maintained in a separate site.

A link to a recipient web site log-on page 330 may also be provided. The recipient web site log-on page 330 may include a log-on section 332 for accepting a password or other security or authenticating information to enable access to further information, which may include privileged, confidential or secret information. Links may be used to access an Archive 342 at a Recipient Web Site 340. Similarly, an email update link 336 may be used to access an Email Update 346 at the Recipient Web Site 340. Various additional options and features may also be provided. For example, a viewer may search the Archive 342 through various search options 344. Key word searches may be implemented, which may include a date query, a topic query, or a product query, etc. The email update 346 may be used send new information to a provider for a database revision or other purposes, for example.

Figure 4:
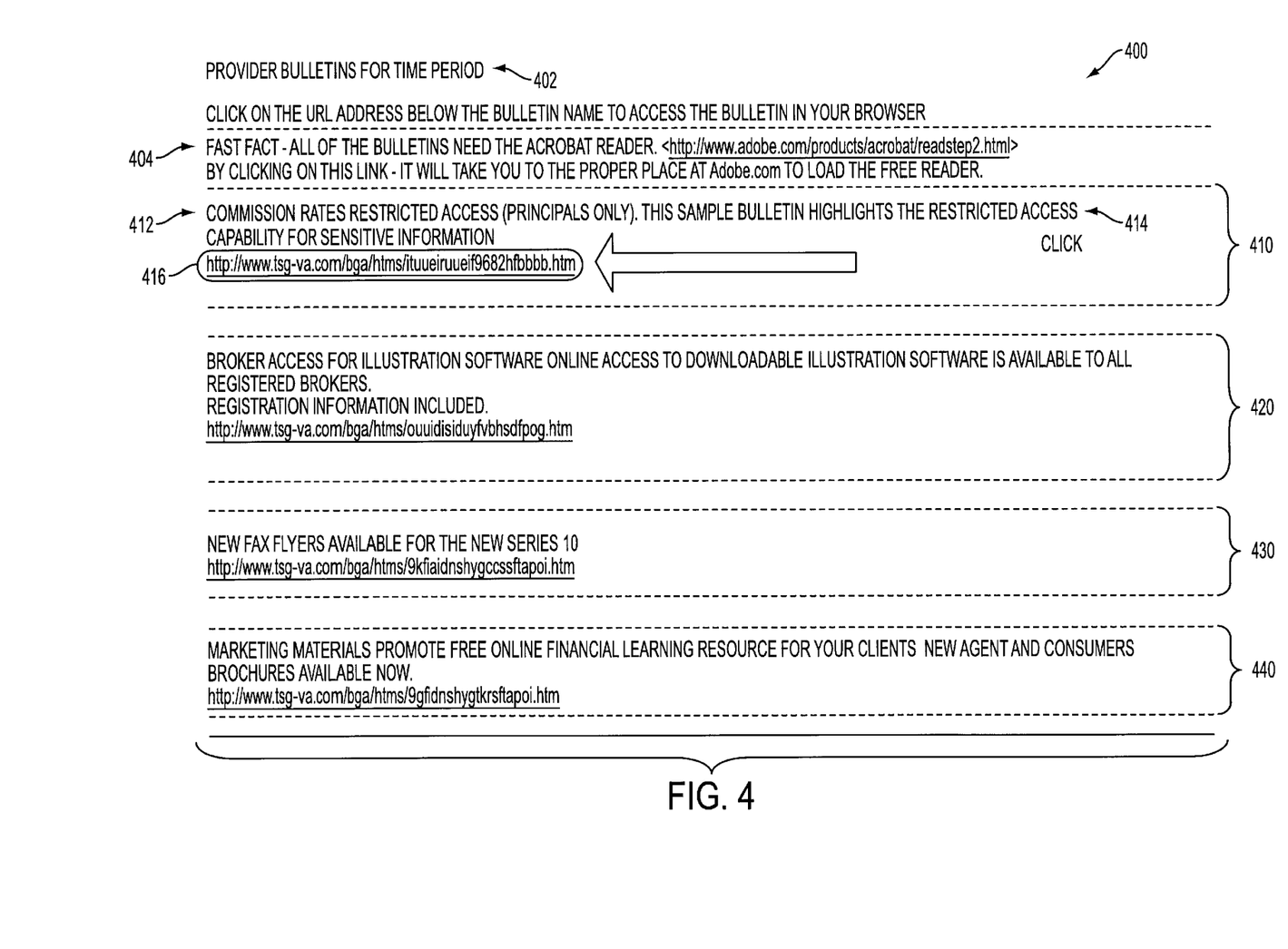
FIG. 4 is an example of a bulletin notification, according to an embodiment of the present invention.

FIG. 4 is an example of a bulletin notification 400, according to an embodiment of the present invention. The bulletin notification 400 may notify an intended recipient of receipt of information related to one or more information bulletins made available during a predetermined time period prior to the transmission of the bulletin notification. For example, the predetermined time period may include every week, every month, etc. Other user defined time periods may be implemented as well. In addition, bulletin notifications may be triggered by an occurrence of one or more predetermined events, for example. The bulletin notification 400 may be in the form of an email message or another electronic communication to one or more recipients.

In the example of FIG. 4, the bulletin notification 400 may be used to convey relevant information for a specific time period as indicated by 402. The bulletin notification 400 may include a plurality of bulletin information sections 410, 420, 430 and 440. Each of the plurality of bulletin information sections 410, 420, 430 may include a bulletin title 412, a summary section 414, a direct link 416 and/or other information related to an associated information bulletin.

The bulletin information sections 410, 420, 430 and 440 may be bundled and sent to a group of intended recipients. The group of intended recipients may include a unit within a business entity, such as a department or other segment of the business entity. The intended recipients may include personnel from a particular level of management who may then in turn forward the relevant bulletin notifications to personnel at another level of management, for example. This feature of the present invention facilitates re-distribution of relevant information to intended recipients.

The bundled notification may include information bulletins of varying types which may include different levels of access authorization. For example, a particular level of management with a higher level of security access may initially receive a bulletin notification. When redistributing the relevant information included in the bulletin notification to another group of intended recipients, the particular level of management may redact a privileged section of the bulletin notification. Further, if the forwarded re-distributed bundled notification inadvertently includes any privileged information, another level of security may be implemented where a separate security mechanism may be imposed requiring a password or another form of authorization for access to the privileged information. Thus, general information bulletins as well as sensitive information bulletins may be efficiently distributed as a bundled unit to an intended group of recipients whereupon redistribution to another level of recipients may be achieved. In addition, redistribution of the information bulletins may further enable selective exclusion of particular material, such as privileged or confidential bulletin notification and links.

In addition, the bulletin notification 400 may include a fast fact section 404. This fast fact section 404 may include information which may be brief (e.g., too small for an information bulletin) but important. The fast fact section 404 may also include general information that may be applicable to a wide range of recipients and/or information bulletins. For example, to enable a recipient to view information bulletins, each recipient may need access to a particular type of reader. Thus, the fast fact section 404 may provide a link to enable a recipient to easily load the particular type of reader for access to bulletin links conveyed in the bulletin notification 400. Other brief and important information may be conveyed as well.

Figure 5:
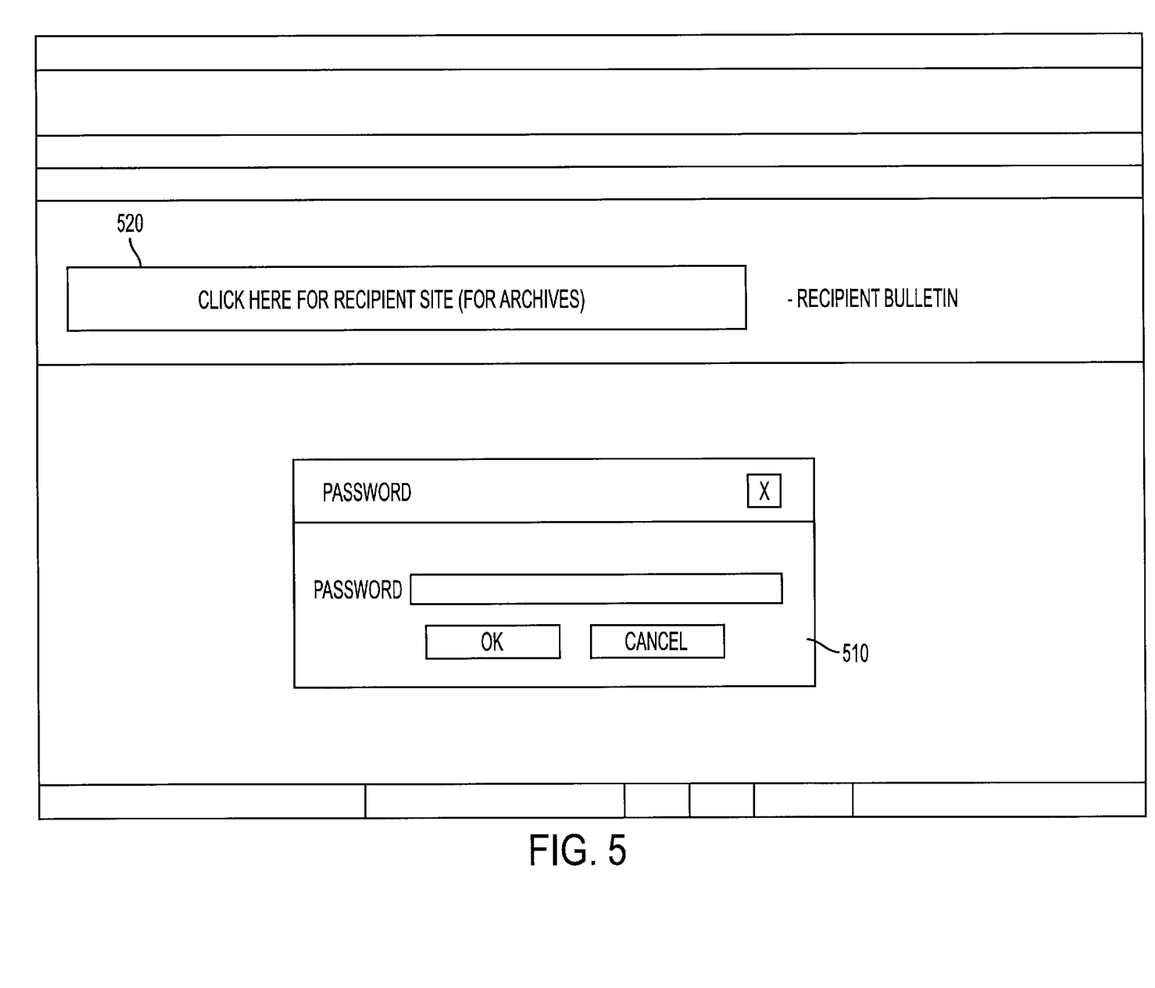
FIG. 5 is an example of a login page for access to an information bulletin, according to an embodiment of the present invention.

For example, the bulletin information section 410 may include confidential material, which may be intended for a particular group of recipients, such as principal agents only. By accessing the link 416, a recipient may be required to enter a password at an input section 510 to view the information bulletin, as illustrated in FIG. 5.

According to another embodiment of the present invention, an archive may include a plurality of search functions to locate and retrieve information bulletins. When accessing information bulletins through a link, a link for the archive may be displayed, as illustrated by a link 520 in FIG. 5, for example.

Figure 6:
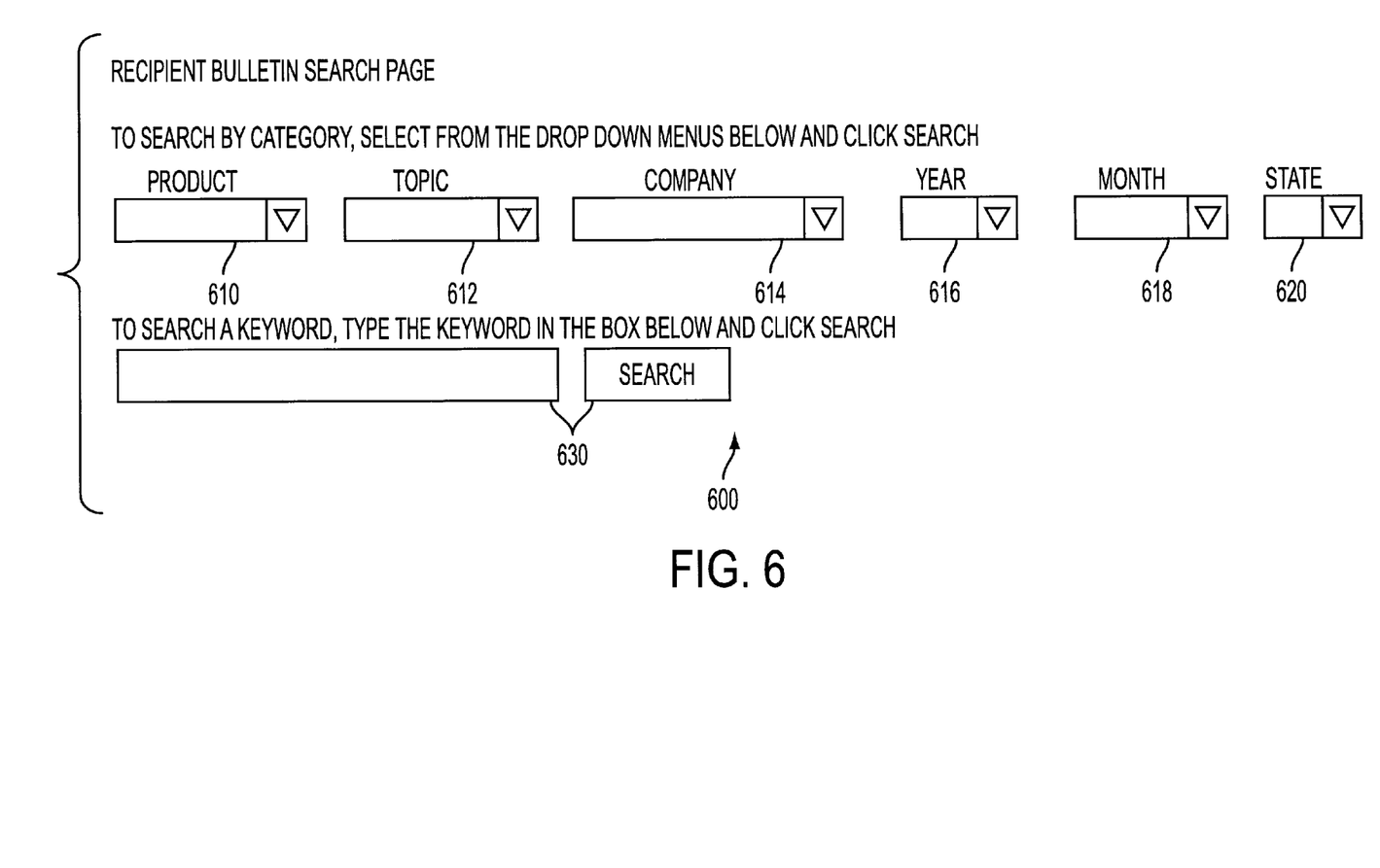
FIG. 6 is an example of a bulletin search page for a recipient of a bulletin notification, according to an embodiment of the present invention.

FIG. 6 is an example of a bulletin search page 600 for a recipient entity, according to an embodiment of the present invention. The bulletin search page 600 may be used to retrieve a plurality of information bulletins and other information stored in an archive associated with the recipient entity. For example, within the recipient entity, there may exist various departments, groups or other segments or units, where each such department, group segment or unit may have access to a particular archive.

The bulletin search page 600 of FIG. 6 may include various search criteria and/or categories which may be selected from a plurality of drop down windows. For example, the various search criteria may include one or more of a Product query 610, a Topic query 612, a Company query 614, a Year query 616, a Month query 618, a State query 620 and other similar search criteria. In another example, a general search of more than one archive associated with different web sites may be performed. For example, a general search may be performed on all active archives as well as selected archives. In a hypothetical scenario, an insurance carrier or provider may communicate with various internal and external customers or other entities. As such, product options under the Product query 610 may include one or more of a NonProduct, a Life Product, an Annuities product, a Long Term Care product and others. Topic options under the Topic query 612 may include one or more of an Application Revision topic, a Bonus topic, a Commissions topic, a Marketing Materials topic, a NonProduct topic, an Operations topic, a Personnel topic, a Policies topic, a Products topic, a Rates topic, a Web site topic and others. Company options under the Company query 614 may include various segments of a customer entity. Other search criteria may be implemented depending on the type of business involved and other needs. In addition, manual search terms may be entered at section 630 for search and retrieval of information bulletins. Advance search terms may also be entered at section 630.

Results of an archive search may be sorted based on user defined or user selected factors (e.g., date, alphabetical, etc.). In addition, the search results may be re-distributed to selected recipients. For intended recipients who may not check electronic communications (e.g., email) on a regular basis or intended recipients who may not receive a bulletin notification, such intended recipients may access an archive and perform a search (e.g., date based search) to retrieve relevant information bulletins and other information.

As is clear from the Detailed Description, the system and method of the present invention provides an easy, user-friendly, efficient means for secure electronic information distribution, archiving and retrieval.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for secure electronic information distribution, archiving and retrieval comprising the steps of:
   identifying one or more information bulletins for distribution to one or more intended recipients;
   converting each information bulletin to a bulletin format wherein the bulletin format restricts modifications to the information bulletin;
   placing each information bulletin in the bulletin format in an archive at a site wherein the information bulletin is accessible by a direct bulletin link wherein each direct bulletin link is a randomly generated address;
   sending a bulletin notification notifying the one or more intended recipients of availability of the one or more information bulletins wherein the bulletin notification comprises an associated bulletin link for each information bulletin; and
   enabling the one or more intended recipients to access the one or more information bulletins through the associated bulletin links.

2. The method of claim 1 further comprising a step of identifying one or more attachments associated with each of the one or more information bulletins.

3. The method of claim 2 further comprising the step of associating each of the one or more attachments with an associated attachment link.

4. The method of claim 3 wherein each of the one or more information bulletins comprises one or more attachment links.

5. The method of claim 3 wherein each of the one or more attachments enables interaction with one of the one or more intended recipients.

6. The method of claim 1 further comprising a step of implementing a security mechanism for the one or more information bulletins wherein the one or more intended recipients is required to enter a password to access one of the information bulletins.

7. The method of claim 1 wherein the bulletin notification is sent to the one or more intended recipients at one or more predetermined intervals.

8. The method of claim 1 wherein the bulletin format is a PDF format.

9. The method of claim 1 wherein the archive is searchable.

10. The method of claim 1 wherein the step of enabling the one or more intended recipients to access the one or more information bulletins through the associated bulletin links further comprises requiring the one or more intended recipients to enter authorization information.

11. A system for secure electronic information distribution, archiving and retrieval comprising:
    identification means for identifying one or more information bulletins for distribution to one or more intended recipients;
    conversion means for converting each information bulletin to a bulletin format wherein the bulletin format restricts modifications to the information bulletin;
    placement means for placing each bulletin in the information bulletin format in an archive at a site wherein the information bulletin is accessible by a direct bulletin link wherein each direct bulletin link is a randomly generated address;
    sending means for sending a bulletin notification notifying the one or more intended recipients of availability of the one or more information bulletins wherein the bulletin notification comprises an associated bulletin link for each information bulletin; and
    access means for enabling the one or more intended recipients to access the one or more information bulletins through the associated bulletin links.

12. The system of claim 11 further comprising attachment identification means for identifying one or more attachments associated with each of the one or more information bulletins.

13. The system of claim 12 further comprising attachment association means for associating each of the one or more attachments with an associated attachment link.

14. The system of claim 13 wherein each of the one or more information bulletins comprises one or more attachment links.

15. The system of claim 13 wherein each of the one or more attachments enables interaction with one of the one or more intended recipients.

16. The system of claim 11 further comprising security means for implementing a security mechanism for the one or more information bulletins wherein the one or more intended recipients is required to enter a password to access one of the information bulletins.

17. The system of claim 11 wherein the bulletin notification is sent to the one or more intended recipients at one or more predetermined intervals.

18. The system of claim 11 wherein the bulletin format is a PDF format.

19. The system of claim 11 wherein the archive is searchable.

20. The system of claim 11 wherein the access means for enabling the one or more intended recipients to access the one or more information bulletins through the associated bulletin links further comprises authorization means for requiring the one or more intended recipients to enter authorization information.

* * * * *